(12) United States Patent
Nozawa et al.

(10) Patent No.: US 12,233,934 B2
(45) Date of Patent: Feb. 25, 2025

(54) STEERING DEVICE

(71) Applicant: JTEKT CORPORATION, Kariya (JP)

(72) Inventors: Yasuyuki Nozawa, Kashihara (JP);
Ryosuke Yamaguchi, Kariya (JP);
Yoshihiro Oono, Katsuragi (JP);
Ryoichi Tokioka, Kashiba (JP)

(73) Assignee: JTEKT CORPORATION, Kariya (JP)

( * ) Notice: Subject to any disclaimer, the term of this patent is extended or adjusted under 35 U.S.C. 154(b) by 0 days.

(21) Appl. No.: 18/713,069

(22) PCT Filed: Sep. 12, 2022

(86) PCT No.: PCT/JP2022/033989
§ 371 (c)(1),
(2) Date: May 23, 2024

(87) PCT Pub. No.: WO2023/119744
PCT Pub. Date: Jun. 29, 2023

(65) Prior Publication Data

US 2025/0018994 A1    Jan. 16, 2025

(30) Foreign Application Priority Data

Dec. 20, 2021  (WO) .................. PCT/JP2021/047025

(51) Int. Cl.
*B62D 1/183*  (2006.01)
*B62D 1/19*   (2006.01)
*B62D 5/00*   (2006.01)

(52) U.S. Cl.
CPC ............. *B62D 1/183* (2013.01); *B62D 1/192* (2013.01); *B62D 5/006* (2013.01)

(58) Field of Classification Search
CPC ......... B62D 1/183; B62D 1/192; B62D 5/006
See application file for complete search history.

(56) References Cited

U.S. PATENT DOCUMENTS 9,333,983 B2 * 5/2016 Lathrop ................ B60K 35/22
10,926,787 B2 * 2/2021 Swamidason .......... B62D 1/185
(Continued)

FOREIGN PATENT DOCUMENTS

CN     207389290 U    5/2018
JP     2020-131958 A  8/2020
(Continued)

OTHER PUBLICATIONS

Feb. 15, 2022 International Search Report issued in International Patent Application No. PCT/JP2021/047025.
(Continued)

*Primary Examiner* — Drew J Brown
(74) *Attorney, Agent, or Firm* — Oliff PLC

(57) ABSTRACT

A steering device that holds a steering member in such a manner that the steering member is movable between a first position where a driver can steer the steering member and a second position located closer to the front of a vehicle includes: a fixed member attached to a vehicle body; a movable member movably attached to the fixed member via a rail mechanism; a steering shaft attached to the movable member and rotatably holding the steering member; and a reaction force device attached to the movable member at a position non-coaxial with the steering shaft and configured to apply a reaction force to the steering shaft.

6 Claims, 5 Drawing Sheets

(56) References Cited

U.S. PATENT DOCUMENTS

| | | | |
|---|---|---|---|
| 2016/0347347 A1* | 12/2016 | Lubischer | B62D 1/181 |
| 2018/0237051 A1* | 8/2018 | Von Freyberg | B62D 1/183 |
| 2018/0370559 A1 | 12/2018 | Swamidason | |
| 2019/0016365 A1 | 1/2019 | Swamidason et al. | |
| 2019/0308655 A1* | 10/2019 | Ochi | B62D 1/181 |
| 2020/0189649 A1 | 6/2020 | Polmans et al. | |
| 2020/0339179 A1* | 10/2020 | Nozawa | B62D 1/192 |
| 2021/0001916 A1 | 1/2021 | Appleyard | |
| 2021/0016820 A1 | 1/2021 | Nozawa et al. | |
| 2021/0061208 A1 | 3/2021 | Horvath | |
| 2021/0129891 A1* | 5/2021 | Ryne | B62D 1/185 |
| 2023/0331283 A1* | 10/2023 | Caverly | B62D 5/006 |

FOREIGN PATENT DOCUMENTS

| | | | |
|---|---|---|---|
| JP | 2020-172139 A | 10/2020 | |
| JP | 2021-130349 A | 9/2021 | |
| JP | 2021-169259 A | 10/2021 | |
| WO | 2019/005736 A1 | 1/2019 | |
| WO | 2019/193956 A1 | 10/2019 | |
| WO | 2020/240763 A1 | 12/2020 | |

OTHER PUBLICATIONS

Nov. 22, 2022 International Search Report issued in International Patent Application No. PCT/JP2022/033989.

* cited by examiner

STEERING DEVICE

TECHNICAL FIELD

The present invention relates to steering devices holding a steering member that is steered by a driver in a vehicle etc.

BACKGROUND ART

Retractable steering devices are known that move a steering member that is steered by a driver toward the front of a vehicle to improve driver's comfort in the vehicle during autonomous driving. Linkless steer-by-wire technology in which a steering shaft holding a steering member is not mechanically connected to steered wheels and information about steering is output to steer the steered wheels is sometimes used for the retractable steering devices (see, for example, Patent Document 1).

RELATED ART DOCUMENTS

Patent Documents

Patent Document 1: WO2019/005736A1

SUMMARY OF THE INVENTION

Problem to be Solved by the Invention

However, in conventional steering devices that advance and retract a steering member with respect to a driver, when the steering member is moved toward the front of the vehicle, vehicle members such as brake-related members and air conditioning-related members interfere with a movable portion of the steering device. It is therefore difficult to secure a large space in front of the driver.

The present invention was made in view of the above problem, and it is an object of the present invention to provide a steering device that can move a steering member further toward the front of a vehicle while avoiding interference with vehicle members etc.

Means for Solving the Problem

In order to achieve the above object, a steering device that is one of the inventions is a steering device that holds a steering member in such a manner that the steering member is movable between a first position where a driver is able to steer the steering member and a second position located closer to a front of a vehicle. The steering device includes: a fixed member attached to a vehicle body; a movable member movably attached to the fixed member via a rail mechanism; a steering shaft attached to the movable member and rotatably holding the steering member; and a reaction force device attached to the movable member at a position non-coaxial with the steering shaft and configured to apply a reaction force to the steering shaft.

Effects of the Invention

According to the present invention, the reaction force device is not present in a lower space extending from the steering shaft toward the front of the vehicle. This can avoid interference with vehicle members when the steering member is moved to the second position located closer to the front of the vehicle, and can increase the space in front of the driver.

MODES FOR CARRYING OUT THE INVENTION

Figure 1:
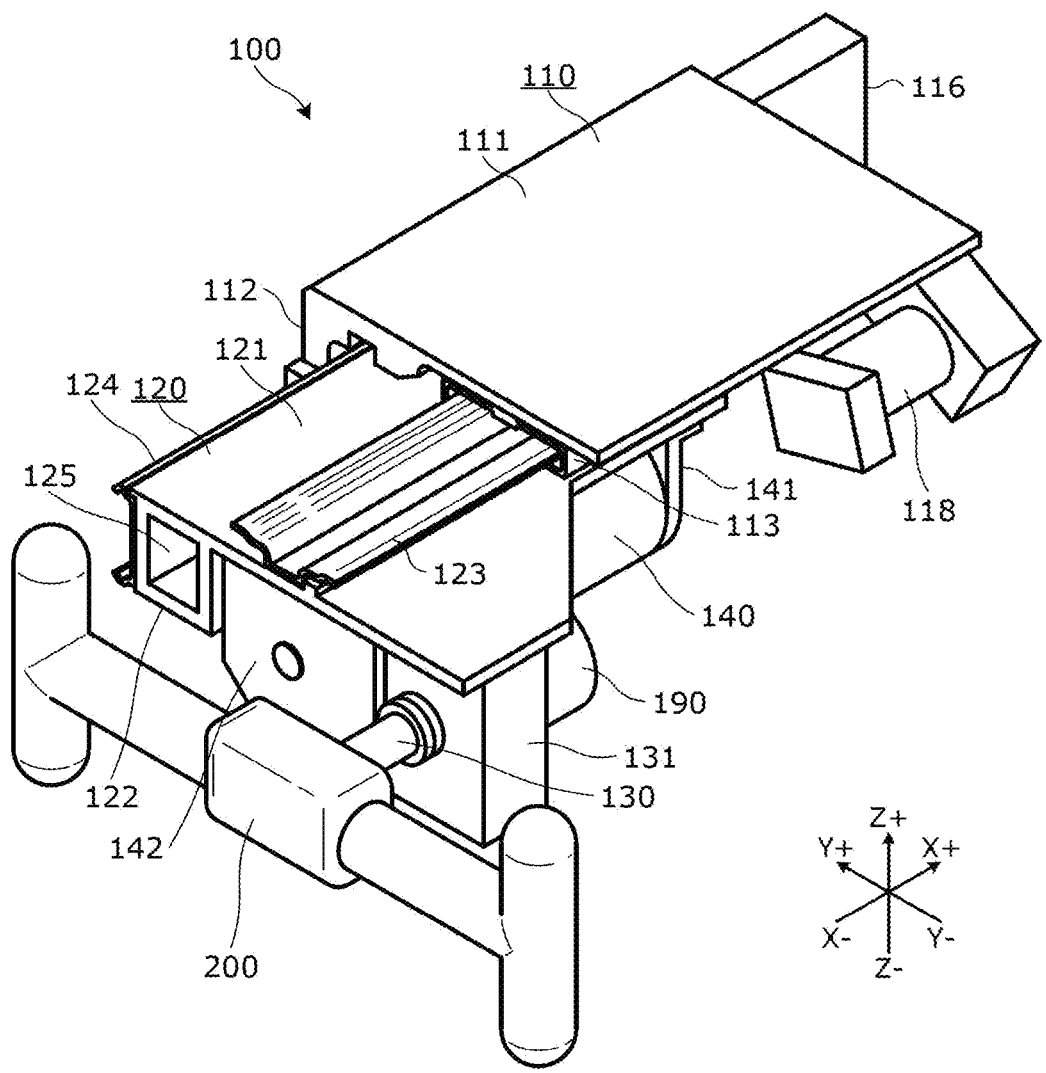
FIG. 1 is a perspective view of a steering device holding a steering member.

An embodiment of a steering device according to the present invention will be described below with reference to the drawings. The following embodiment shows an example in order to describe the present invention, and is not intended to limit the present invention. For example, the shapes, structures, materials, components, relative positional relationships, connection states, numerical values, mathematical expressions, and the content, order, etc. of steps of each method shown in the following embodiment are merely by way of example, and the present invention may include the content that is not described below. Although geometric terms such as parallel and perpendicular are sometimes used, these terms are not used in a mathematically strict sense, and may include substantially allowable variations, deviations, etc. Terms such as simultaneously and same also include substantially allowable ranges.

The drawings are schematic illustrations with exaggerations, omissions, or adjustments of proportions being made as appropriate in order to describe the present invention, and the shapes, positional relationships, and proportions shown in the drawings are different from actual shapes, positional relationships, and proportions. The X-axis, Y-axis, and Z-axis that may be shown in the drawings indicate rectangular coordinates that are set as desired in order to describe the drawings. In other words, the Z-axis is not necessarily an axis along the vertical direction, and the X-axis and Y-axis are not necessarily present in a horizontal plane.

A plurality of inventions may be comprehensively described as one embodiment below. Some of the content described below is described as optional components related to the present invention.

Figure 2:
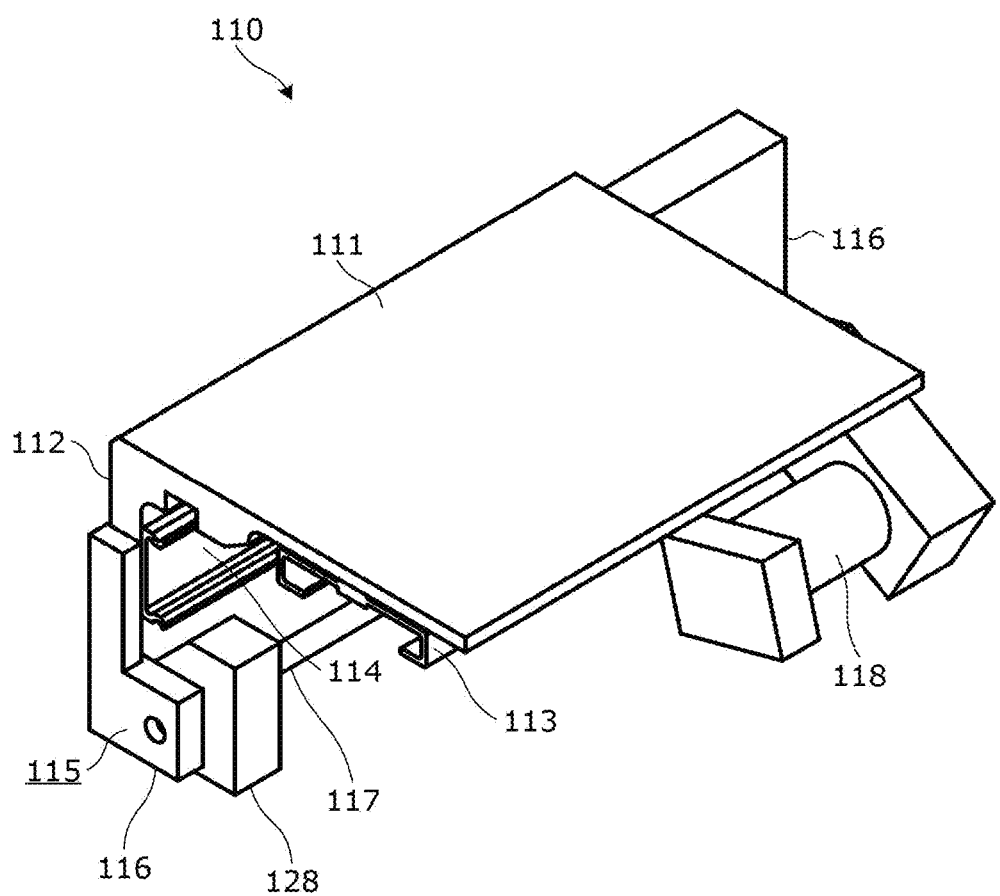
FIG. 2 is a perspective view of a fixed member.
Figure 2:
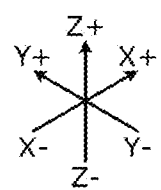
Figure 3:
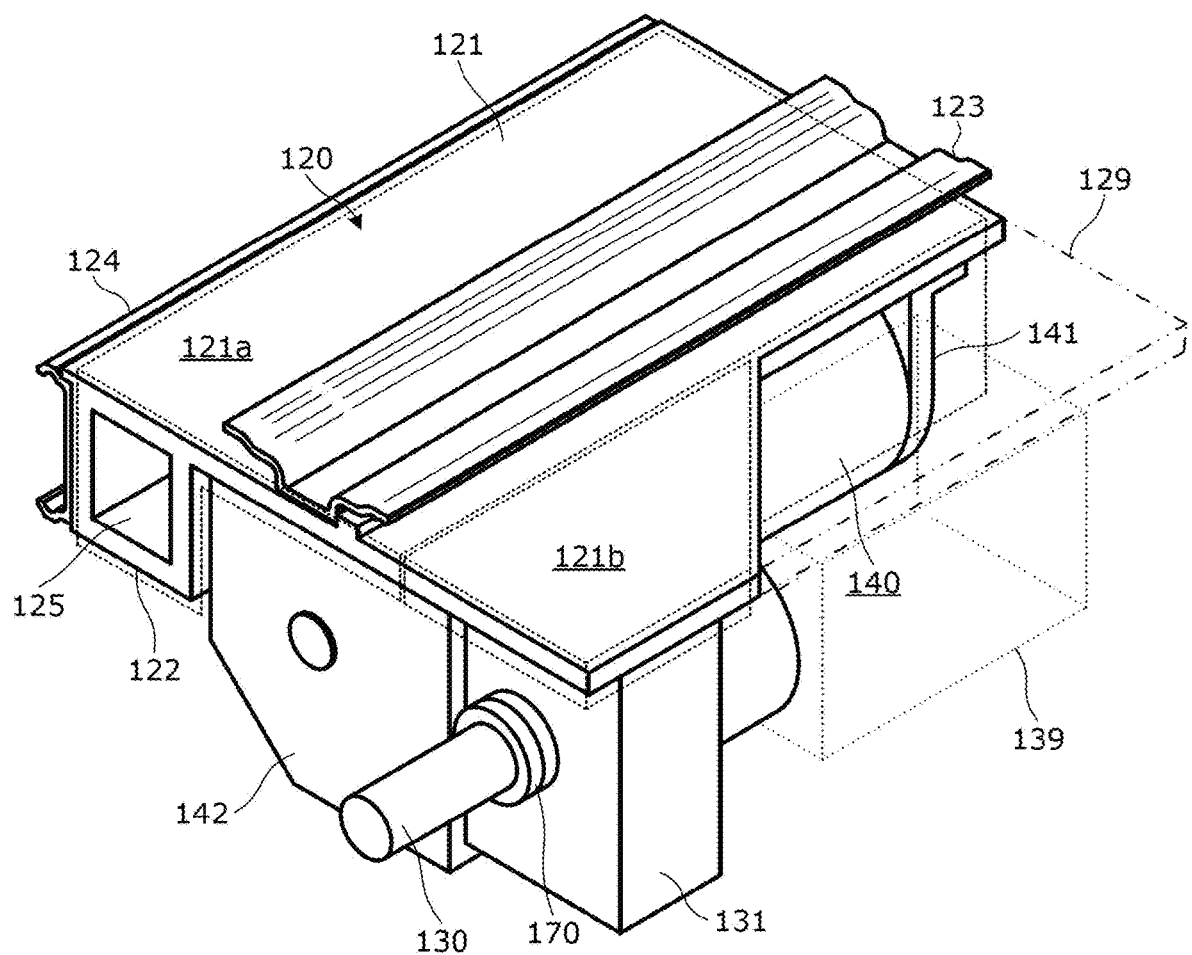
FIG. 3 is a perspective view of a movable member and members that move with the movable member.
Figure 4:
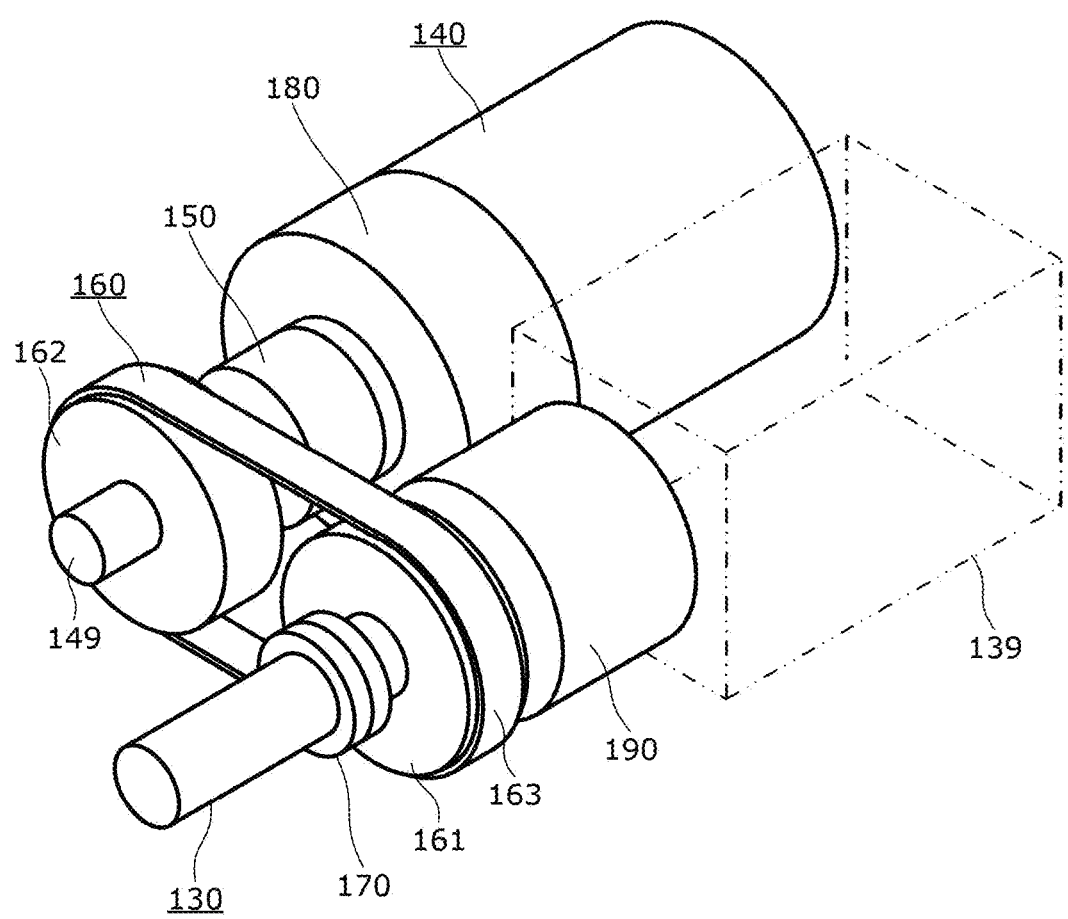
FIG. 4 is a perspective view of the steering device with the fixed member, movable member, etc. omitted.
Figure 4:
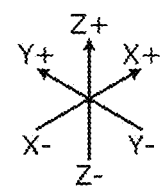

FIG. 1 is a perspective view of a steering device holding a steering member. FIG. 2 is a perspective view of a fixed member. FIG. 3 is a perspective view of a movable member and members that move with the movable member. FIG. 4 is a perspective view of the steering device with the fixed member, movable member, etc. omitted. A steering device 100 is a steering device 100 that holds a steering member 200 in such a manner that the steering member 200 is movable between a first position that is a position where a driver can steer the steering member 200 and a second position located closer to the front of the vehicle. The steering device 100 includes a fixed member 110, a movable member 120, a steering shaft 130, and a reaction force device 140. In the present embodiment, the steering device 100 includes a torque detection device 150, a reaction force transmission device 160, a steering angle sensor 170, a speed reducer 180, and a rotation amount regulation device 190.

The fixed member 110 is a member that is fixedly attached to a reinforcement that is one of structural members of a vehicle body, etc. The manner in which the fixed member 110 is attached to the vehicle body is not limited, but in the present embodiment, the fixed member 110 is attached in a suspended state to a reinforcement extending in the width direction of the vehicle body. The sectional shape of the fixed member 110 perpendicular to the direction of movement of the movable member 120 (X-axis direction in the figure) is an L-shape rotated 90 degrees to the right. The fixed member 110 includes a fixed top plate portion 111 in the form of a plate and a fixed wall portion 112 extending downward from one side (Y+ side in the figure) in the width direction (Y-axis direction in the figure) of the fixed top plate portion 111. A first fixed rail 113, namely one of fixed rails that is a constituent member of a rail mechanism, is fixedly attached to the lower surface (surface on the Z− side in the figure) of the fixed top plate portion 111 so as to extend in the direction of movement of the movable member 120. A second fixed rail 114, namely one of the fixed rails that is another constituent member of the rail mechanism, is fixedly attached to the other side in the width direction (Y− side in the figure) of the fixed wall portion 112 so as to extend in the direction of movement of the movable member 120. As described above, the movable member 120, parts attached to the movable member 120, etc. can be slidably held with high support stiffness based on the two-rail mechanism composed of the first fixed rail 113 attached to the fixed top plate portion 111 and the second fixed rail 114 attached to the fixed wall portion 112 perpendicular to the fixed top plate portion 111. In particular, providing the rail mechanism on each of the perpendicular surfaces can increase torsional stiffness and allows the movable member 120 and the parts attached to the movable member 120 to slide stably. The rail mechanism may include a single fixed rail.

A moving device 115 for moving the movable member 120 is attached to the lower part (Z− side in the figure) of the fixed member 110. The type of moving device 115 is not particularly limited, but in the present embodiment, the moving device 115 includes: a feed screw 117 that is fixedly attached to the movable member 120 via a fixed bracket 116 so as to extend in the direction of movement of the movable member 120; a movable nut 128 that meshes with the feed screw 117 and reciprocates in the direction of movement of the movable member 120 with rotation of the feed screw 117; and a rotational drive device 118 including a motor for rotating the feed screw 117. As described above, by rotating the feed screw 117 extending along the first fixed rail 113 and a second movable rail 124 to cause the movable nut 128 to reciprocate, the movable member 120 and the parts attached to the movable member 120 can be moved smoothly. By stopping the rotation of the feed screw 117, the movable member 120 and the parts attached to the movable member 120 can be fixed at desired positions.

Figure 5:
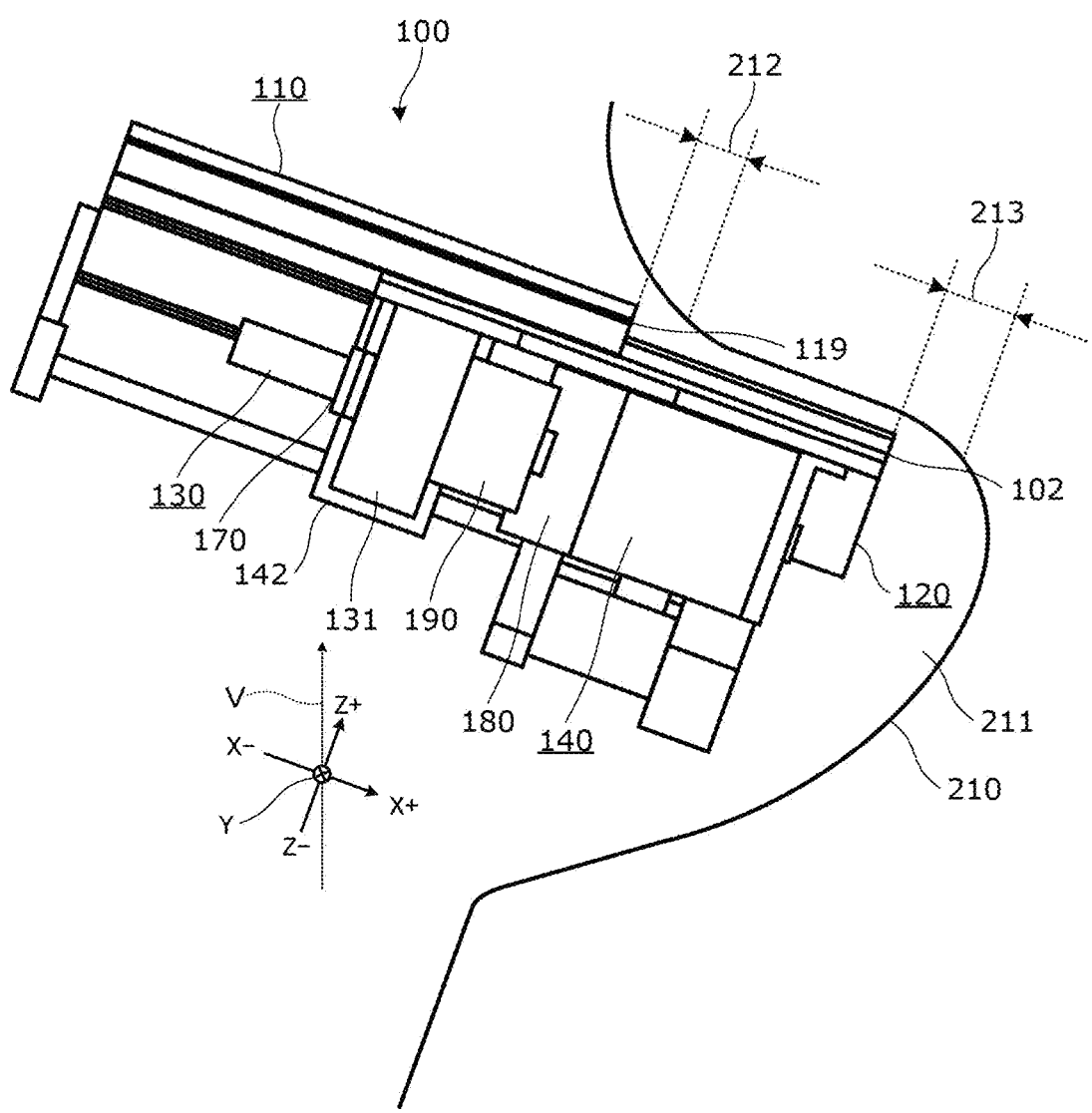
FIG. 5 is a side view of the steering device attached to a vehicle body and a vehicle member.

FIG. 5 is a side view of the steering device attached to the vehicle body and a vehicle member. When the steering device 100 is attached to the vehicle body, the direction of movement of the movable member 120 (X-axis in the figure) is tilted with respect to the vertical axis (V-axis in the figure) with the driver side higher than the vehicle front side. A vehicle member 210 such as a so-called dash panel is located on the vehicle front side of the steering device 100. The fixed member 110 is attached to the vehicle body in such a manner that, in a normal state (state where no collision occurs), a first clearance 212 between a fixed front end 119 of the fixed member 110 and the vehicle member 210 is larger than the amount of movement of the vehicle member 210 in case of a collision. Therefore, even if a collision occurs, the steering device 100 will not hinder the shock absorption function provided by deformation of the vehicle body.

The movable member 120 is a member that is attached such that it can reciprocate between the first position and the second position with respect to the fixed member 110 by the rail mechanism and the moving device 115. The sectional shape of the movable member 120 perpendicular to the direction of movement of the movable member 120 (X-axis direction in the figure) is an L-shape rotated 90 degrees to the right. The movable member 120 includes a movable top plate portion 121 in the form of a plate and a movable wall portion 122 extending downward from one side (Y+ side in the figure) in the width direction (Y-axis direction in the figure) of the movable top plate portion 121. A first movable rail 123, namely one of movable rails that is a constituent member of a rail mechanism and that moves along the first fixed rail 113, is fixedly attached to the upper surface (surface on the Z− side in the figure) of the movable top plate portion 121 so as to extend in the direction of movement. A second movable rail 124, namely one of the movable rails that is another constituent member of the rail mechanism and that moves along the second fixed rail 114, is fixedly attached to one side in the width direction (Y+ side in the figure) of the movable wall portion 122 so as to extend in the direction of movement. The first fixed rail 113 and the first movable rail 123, and the second fixed rail 114 and the second movable rail 124, are each linearly movably coupled via two ball rows (not shown) held by a retainer. As described above, by providing two ball rows in each of the two-rail mechanisms, a two-slide structure that slides via a rolling member is placed on a surface parallel to the fixed top plate portion 111, and a two-slide structure that slides via a rolling member is also placed on a surface perpendicular to the fixed top plate portion 111. Therefore, the movable member 120, the parts attached to the movable member 120, etc. can be held with higher support stiffness so as to be slidable with respect to the fixed member 110.

The movable member 120 integrally includes a first movable portion 121a and a second movable portion 121b. The first movable portion 121a and the second movable portion 121b are located next to each other in the vehicle width direction (Y-axis direction in the figure). The first movable portion 121a is a portion to which the first movable rail 123 is fixedly attached so as to extend in the direction of movement. In the present embodiment, the second movable rail 124 is also attached to the first movable portion 121a. The second movable portion 121b is a portion to which the steering shaft 130 is attached.

The steering shaft 130 is attached to the second movable portion 121b via a first housing 131. The first movable portion 121a is longer toward the front of the vehicle (X+ side in the figure) than the second movable portion 121b. In other words, the first movable portion 121a protrudes beyond the second movable portion 121b toward the front of the vehicle. This allows the first movable portion 121a to be inserted into a space narrower than the movable member 120 in the width direction of the vehicle body, so that the stroke of movement of the movable member 120 and the parts attached to the movable member 120 with respect to the fixed member 110 can be increased.

The movable top plate portion 121 has a cut portion 129 and has an L-shape as viewed in plan. The cut portion 129 is defined by the side surface on the other side in the vehicle width direction (Y− side in the figure) of a part of the first movable portion 121a that protrudes beyond the second movable portion 121b toward the front of the vehicle, and the end face on the vehicle front side of the second movable portion 122a.

When the steering member 200 is located at the first position, the movable member 120 and members that move with the movable member 120 are not present in the cut portion 129 and a lower space 139 that is a space where a region under the cut portion 129 and an imaginary region extended from the steering shaft 130 toward the front of the vehicle (X+ side in the figure) intersect each other. In other words, even if the vehicle member enters the cut portion 129 and the lower space 139 when the steering member 200 is moved from the first position to the second position, the vehicle member will not interfere with the movable member 120 and the members that move with the movable member 120. This allows the positions of the movable member 120 and the members that move with the movable member 120 when the steering member 200 is moved to the second position to be set as close to the front of the vehicle as possible. The stroke of movement of the movable member 120 and the members that move with the movable member 120 when the movable member 120 is moved from the first position to the second position can thus be increased.

The first movable rail 123 is longer toward the front of the vehicle than the second movable portion 121b. In the present embodiment, the first movable rail 123 extends from the end on the vehicle front side of the first movable portion 121a to the end on the vehicle rear side of the first movable portion 121a. However, the present invention is not limited to this, and the first movable rail 123 and the second movable rail 124 may extend to an intermediate position in the first movable portion 121a. The first movable portion 121a is longer than the second movable portion 121b in the front-rear direction of the vehicle. Therefore, the first movable rail 123 can also be made longer than the second movable portion 121b, and can be disposed so as to protrude beyond the second movable portion 121b toward the front of the vehicle. This increases the fitting length between the first fixed rail 113 and the first movable rail 123 and the fitting length between the second fixed rail 114 and the second movable rail 124 when the steering member 200 is located at the first position. Support stiffness can thus be improved.

The movable wall portion 122 is thicker than the fixed wall portion 112 in the width direction, and has a through hole 125 through which a harness to be connected to an operation switch etc. is inserted. This secures a space for routing the harness etc., so that the harness etc. are less likely to interfere with the movable member 120 etc. when the movable member 120 and the parts attached to the movable member 120 are caused to slide.

When the movable member 120 is located at the second position, at least part of the front side of the movable member 120 is inserted in a recessed portion 211 of the vehicle member 210 mounted inside the vehicle body, as shown in FIG. 5. The steering device 100 is attached to the vehicle body in such a manner that a second clearance 213 between a movable front end 102 of the movable member 120 at the second position and the recessed portion 211 is larger than the amount of movement of the vehicle member in case of a collision. The movable front end 102 that is the end on the vehicle front side of the movable member 120 is located forward of a fixed front end 119 that is the end on the vehicle front side of the fixed member 110. The movable member 120 can thus be moved to as close to the front of the vehicle as possible. Therefore, even if a collision occurs, the steering device 100 will not hinder the shock absorption function provided by deformation of the vehicle body. Moreover, the fixed member 110 can be made shorter than the movable member 120 in the direction of movement of the movable member 120, so that the steering device 100 can be reduced in size and weight.

The steering shaft 130 is a member that is attached to the movable member 120 and rotatably holds the steering member 200. The shape of the steering shaft 130 is not particularly limited, and may be, for example, a cylinder or a hexagonal prism. The sectional shape or sectional area of the steering shaft 130 may vary in the axial direction. In the present embodiment, the steering shaft 130 is attached, via the first housing 131 fixedly attached in a hanging manner to the movable member 120, to the movable member 120 in such a manner that the steering shaft 130 is rotatable about its axis. The first housing 131 is a housing that houses part of the reaction force transmission device 160, and includes a bearing (not shown) that rotatably holds the steering shaft 130. The axis of the steering shaft 130 and the direction of movement of the movable member 120 may not be parallel.

The movable member 120 and the members that move with the movable member 120 are not present in the cut portion 129 and the lower space 139. Specifically, the steering shaft 130, the reaction force device 140, etc. are not present in the cut portion 129 and the lower space 139. In other words, even when the vehicle member enters the cut portion 129 and the lower space 139 as the movable member 120 is moved from the first position to the second position, the vehicle member will not interfere with the movable member 120 and the members that move with the movable member 120 such as the steering shaft 130 and the reaction force device 140. This allows the positions of the movable member 120 and the members that move with the movable member 120 when the movable member 120 is moved to the second position to be set as close to the front of the vehicle as possible. The stroke of movement of the movable member 120 and the members that move with the movable member 120 when the movable member 120 is moved from the first position to the second position can thus be increased.

The steering angle sensor 170 is attached to the end on the driver side (X-side in the figure) of the steering shaft 130. In the case of the steer-by-wire steering device 100, the rotation angle of the steering shaft 130, that is, the steering angle of the steering member 200, is detected by the steering angle sensor 170, and steered wheels are steered based on a signal from the steering angle sensor 170.

The rotation amount regulation device 190 is attached to the end on the vehicle front side (X+ side in the figure) of the steering shaft 130. The rotation amount regulation device 190 is a mechanism that regulates the rotation angle of the steering shaft 130 within a predetermined range. In the case of the linkless steer-by-wire steering device 100, there is no such connection mechanism between the steering shaft 130 and the steered wheels that regulates the rotation angle of the steering shaft 130. Therefore, the rotation end of the steering member 200 is determined by software by controlling the reaction force device 140. However, the rotation amount regulation device 190 that mechanically regulates rotation of the steering member 200 within the predetermined angle range is provided in case that, for example, power is not supplied to the reaction force device 140. The rotation amount regulation device 190 is also not disposed in the lower space 139, so that the vehicle member that enters the lower space 139 does not interfere with the rotation amount regulation device 190.

The reaction force device 140 is fixedly attached to the first movable portion 121a in the movable top plate portion 121 of the movable member 120. The reaction force device 140 is attached in a hanging manner to the first movable portion 121a via a movable bracket 141 and the reaction force transmission device, speed reducer 180, and second housing 142 that will be described later. In the present embodiment, the movable bracket 141 is attached to the first movable portion 121*a*, and the second housing 142 is attached to both the first movable portion 121*a* and the second movable portion 121*b*. The reaction force device 140 is disposed non-coaxially with (offset from) the steering shaft 130. In the present embodiment, an output shaft 149 of a motor included in the reaction force device 140 is disposed parallel to the steering shaft 130. However, the output shaft 149 may not be parallel to the steering shaft 130. The first movable portion 121*a* to which the reaction force device 140 is attached is located on one side in the vehicle width direction (X+ side in the figure) with respect to the second movable portion 121*b* to which the steering shaft 130 is attached. That is, the reaction force device 140 is disposed to the left side of the steering shaft 130 as viewed from the driver side. This arrangement avoids interference between the reaction force device 140 and a brake-related member that is the vehicle member, and allows the movable member 120 and the members that move with the movable member 120 to move toward the front of the vehicle. Since the reaction force device 140 is disposed on the first movable portion 121*a* non-coaxially with the steering shaft 130, the second movable portion 121*b* can be made as short as possible compared to the first movable portion 121*a*. This can avoid the movable member 120 (second movable portion 121*b*) interfering with other parts when the movable member 120 is moved toward the front of the vehicle.

The reaction force transmission device 160 is a device that transmits a reaction force generated by the reaction force device 140 to the steering shaft 130 disposed along the output shaft 149. The type of reaction force transmission device 160 is not particularly limited, and for example, the reaction force transmission device 160 may be a transmission device using a belt or a transmission device using gears.

In the present embodiment, the reaction force transmission device 160 includes a shaft-side pulley 161, a reaction force-side pulley 162, and a belt 163. The shaft-side pulley 161 and the reaction force-side pulley 162 have the same diameter. The shaft-side pulley 161 is coaxially attached to the steering shaft 130, and the reaction force-side pulley 162 is attached to the output shaft 149 of the reaction force device 140. The distance between the first housing 131 holding the steering shaft 130 and the second housing 142 holding the output shaft 149 is adjustable in the width direction (Y-axis direction in the figure), so that the tension of the belt 163 can be adjusted. The reaction force transmission device 160 disposed on the rear side (X− side in the figure) of the movable member 120 can thus transmit torque to the steering shaft 130 while allowing the reaction force device 140 to be disposed under the first movable portion 121*a*. The large lower space 139 can thus be secured. Accordingly, the stroke of movement of the movable member 120 and the parts attached to the movable member 120 can be increased without the reaction force device 140 interfering with the vehicle member.

The speed reducer 180 is a device that reduces the rotational speed of the motor included in the reaction force device 140 by a predetermined reduction ratio and transmits torque to the steering shaft 130. The type of speed reducer 180 is not particularly limited, but in the present embodiment, a coaxial reducer is used, and is connected to the output shaft 149 of the motor included in the reaction force device 140. In the present embodiment, the output shaft of the motor included in the reaction force device 140 and an output shaft of the speed reducer 180 disposed coaxially with the reaction force device 140 are collectively referred to as the output shaft 149. As described above, since a coaxial reducer coaxial with the reaction force device 140 is used as the speed reducer 180, torque can be transmitted to the steering shaft 130 while allowing the speed reducer 180 to be disposed under the first movable portion 121*a*. The large lower space 139 can thus be secured. Accordingly, the stroke of movement of the movable member 120 and the parts attached to the movable member 120 can be increased without the speed reducer 180 interfering with the vehicle member.

The speed reducer 180 is disposed on the first movable portion 121*a* to which the reaction force device 140 is attached in the movable top plate portion 121 of the movable member 120. Since the first movable portion 121*a* protrudes beyond the second movable portion 121*b* toward the front of the vehicle and is longer than the second movable portion 121*b*, the speed reducer 180 can be disposed coaxially with the output shaft of the reaction force device 140. On the other hand, since the second movable portion 121*b* does not have the reaction force device 140 coaxially with the steering shaft 130, the second movable portion 121*b* can be made as short as possible compared to the first movable portion 121*a*, and as described above, the cut portion 129 can be provided in the movable member 120 and the lower space 139 can be provided under the cut portion 129. The movable member 120 and the members that move with the movable member 120 are not present in the cut portion 129 and the lower space 139. Therefore, even if the vehicle member enters the cut portion 129 and the lower space 139 when the movable member 120 is moved from the first position to the second position, the vehicle member will not interfere with the movable member 120 and the members that move with the movable member 120. This allows the positions of the movable member 120 and the members that move with the movable member 120 when the steering member 200 is moved to the second position to be set as close to the front of the vehicle as possible. The stroke of movement of the movable member 120 and the members that move with the movable member 120 when the steering member 200 is moved from the first position to the second position can thus be increased.

By disposing the speed reducer 180 on the reaction force device 140 side, the reduction ratio of the reaction force transmission device 160 can be set to 1:1. Therefore, input torque from the steering member 200 can be accurately measured even when the torque detection device 150 is coaxially attached to the output shaft 149 of the reaction force device 140. Accordingly, the lower space 139 can further be increased in length in the direction of movement of the movable member 120. This avoids interference with the vehicle member and allows the second position of the steering member 200 to be set closer to the front of the vehicle.

The steering device 100 of the embodiment is the steering device 100 that holds the steering member in such a manner that the steering member is movable between the first position where the driver can steer the steering member and the second position located closer to the front of the vehicle. The steering device 100 includes: the fixed member 110 attached to the vehicle body; the movable member 120 movably attached to the fixed member 110 via the rail mechanism; the steering shaft 130 attached to the movable member 120 and rotatably holding the steering member 200; and the reaction force device 140 attached to the movable member 120 at a position non-coaxial with the steering shaft 130 and configured to apply a reaction force to the steering shaft 130.

According to such a steering device 100, the reaction force device 140 is not present in the lower space 139 extending from the steering shaft 130 toward the front of the vehicle. This can avoid interference with the vehicle member when the steering member 200 is moved from the first position to the second position. This allows the second position of the steering member 200 to be set as close to the front of the vehicle as possible, so that a large space can be secured in front of the driver when the steering member 200 is located at the second position.

In the steering device 100 of the embodiment, the rail mechanism includes the fixed rails (first fixed rail 113, second fixed rail 114) attached to the fixed member 110, and the movable rails (first movable rail 123, second movable rail 124) attached to the movable member 120. The movable member 120 includes the first movable portion 121a on which the reaction force device 140 and the movable rails (first movable rail 123, second movable rail 124) are disposed, and the second movable portion 121b on which the steering shaft 130 is disposed. The first movable portion 121a and the second movable portion 121b are located next to each other in the width direction of the vehicle. The first movable portion 121a is longer toward the front of the vehicle than the second movable portion 121b, and the movable rails (first movable rail, second movable rail 124) are longer toward the front of the vehicle than the second movable portion 121b.

According to such a steering device 100, the shape protruding toward the front of the vehicle can be provided by the second movable portion 121b. This increases the fitting lengths with the fixed rails (first fixed rail 113, second fixed rail 114) in the state where the steering member 200 is moved to the first position. Support stiffness can thus be improved.

In the steering device 100 of the embodiment, the fixed member 110 is attached to the vehicle body in such a manner that the clearance 212 between the front end 119 of the fixed member 110 and the vehicle member 210 mounted inside the vehicle body is larger than the amount of movement of the vehicle member in case of a collision.

According to such a steering device 100, even if a collision occurs, interference between the fixed member 110 and the vehicle member 210 can be avoided, and the steering device 100 will not hinder the shock absorption function provided by deformation of the vehicle body.

In the steering device 100 of the embodiment, when the movable member 120 is located at the second position with respect to the fixed member 110, the front end 102 of the movable member 120 is located forward of the front end 119 of the fixed member 110 in the front-rear direction of the vehicle, at least part of the movable member 120 is inserted into the recessed portion 211 of the vehicle member 210 mounted inside the vehicle body, and the clearance 213 between the front end 102 of the movable member 120 and the recessed portion 211 is larger than the amount of movement of the vehicle member in case of a collision.

According to such a steering device 100, the movable member 120 can be moved to as close to the front of the vehicle as possible. Therefore, even if a collision occurs, interference between the movable member 120 and the vehicle member 210 can be avoided, and the steering device 100 will not hinder the shock absorption function provided by deformation of the vehicle body. Moreover, the fixed member 110 can be made shorter than the movable member 120 in the direction of movement of the movable member 120, so that the steering device 100 can be reduced in size and weight.

The steering device 100 of the embodiment further includes the torque detection device 150 disposed coaxially with the output shaft 149 of the reaction force device 140.

According to such a steering device 100, the torque detection device 150 is not present in the lower space 139 extending from the steering shaft 130 toward the front of the vehicle. This can avoid interference with the vehicle member when the steering member 200 is moved to the second position located closer to the front of the vehicle. The second position of the steering member 200 can thus be set as close to the front of the vehicle as possible, and the space in front of the driver when the steering member 200 is located at the second position can be increased.

The present invention is not limited to the above embodiment. For example, there may be other embodiments of the present invention that are implemented by combining the components described in this specification as desired or omitting some of the components. The present invention also includes modifications obtained by making various changes that occur to those skilled in the art to the above embodiment without departing from the spirit and scope of the present invention, that is, from the meaning of the terms in the claims.

For example, as a modification, the diameter of the shaft-side pulley 161 and the diameter of the reaction force-side pulley 162 may be made different from each other so that the reaction force transmission device 160 functions also as a speed reducer. The speed reducer 180 can thus be omitted from the steering device 100. In this case, the torque detection device 150 is preferably interposed in the steering shaft 130.

The steering device of the modification includes the torque detection device 150 disposed coaxially with the steering shaft 130. According to such a steering device, input torque from the steering member 200 can be detected by the torque detection device 150 before it changes due to the speed reduction function. Therefore, torque detection accuracy can be improved.

The steering device 100 may include a tilt mechanism that tilts the direction of movement of the movable member 120. In this case, the fixed member 110 may be swingably attached to the vehicle body, and the movable member 120 may be swingably attached to the fixed member 110.

For example, in the case where the movable member 120 at the second position is movable rearward with respect to the fixed member 110 in case of a collision, the clearance between the front end 102 of the movable member 120 at the second position and the recessed portion 211 may not be larger than the amount of movement of the vehicle member in case of a collision. This is because the steering member 200 is located away from the driver and therefore deformation of the vehicle body due to a collision will not affect the driver via the steering member 200.

INDUSTRIAL APPLICABILITY

The present invention can be used for steer-by-wire steering devices for steering a vehicle such as a motor vehicle, a bus, or a truck.

DESCRIPTION OF THE REFERENCE NUMERALS

100 . . . steering device, 102 . . . movable front end, 110 . . . fixed member, 111 . . . fixed top plate portion, 112 . . . fixed wall portion, 113 . . . first fixed rail, 114 . . . second fixed rail, 115 . . . moving device, 116 . . . fixed bracket, 117 . . . feed screw, 118 . . . rotational drive device, 119 . . . fixed front end, 120 . . . movable member, 121 . . . movable top plate portion, 122 . . . movable wall portion, 123 . . . first movable rail, 124 . . . second movable rail, 125 . . . through hole, 128 . . . movable nut, 129 . . . cut portion, 130 . . . steering shaft, 131 . . . first housing, 139 . . . lower space, 140 . . . reaction force device, 141 . . . movable bracket, 142 . . . second housing, 149 . . . output shaft, 150 . . . torque detection device, 160 . . . reaction force transmission device, 161 . . . shaft-side pulley, 162 . . . reaction force-side pulley, 163 . . . belt, 170 . . . steering angle sensor, 180 . . . speed reducer, 190 . . . rotation amount regulation device, 200 . . . steering member, 210 . . . vehicle member, 211 . . . recessed portion, 212 . . . first clearance, 213 . . . second clearance

The invention claimed is:

1. A steering device that holds a steering member in such a manner that the steering member is movable between a first position where a driver is able to steer the steering member and a second position located closer to a front of a vehicle, the steering device comprising:
   a fixed member attached to a vehicle body;
   a movable member movably attached to the fixed member via a rail mechanism;
   a steering shaft attached to the movable member and rotatably holding the steering member; and
   a reaction force device attached to the movable member at a position non-coaxial with the steering shaft and configured to apply a reaction force to the steering shaft, wherein
   the movable member includes a first movable portion on which the reaction force device is disposed, and a second movable portion on which the steering shaft is disposed, the first movable portion and the second movable portion are located next to each other in a width direction of the vehicle, and the first movable portion is longer toward the front of the vehicle than the second movable portion.

2. The steering device according to claim 1, wherein:
   the rail mechanism includes
      a fixed rail attached to the fixed member, and
      a movable rail attached to the movable member;
   the movable member includes
      a first movable portion on which the reaction force device and the movable rail are disposed, and
      a second movable portion on which the steering shaft is disposed;
   the first movable portion and the second movable portion are located next to each other in the width direction of the vehicle;
   the first movable portion is longer toward the front of the vehicle than the second movable portion; and
   the movable rail is longer toward the front of the vehicle than the second movable portion.

3. The steering device according to claim 1, wherein the fixed member is attached to the vehicle body in such a manner that a clearance between a front end of the fixed member and a vehicle member mounted inside the vehicle body is larger than an amount of movement of the vehicle member in case of a collision.

4. The steering device according to claim 1, wherein when the movable member is located at the second position with respect to the fixed member, a front end of the movable member is located forward of a front end of the fixed member in a front-rear direction of the vehicle, at least part of the movable member is inserted into a recessed portion of a vehicle member mounted inside the vehicle body, and a clearance between the front end of the movable member and the recessed portion is larger than an amount of movement of the vehicle member in case of a collision.

5. The steering device according to claim 1, further comprising a torque detection device disposed coaxially with the steering shaft.

6. The steering device according to claim 1, further comprising a torque detection device disposed coaxially with an output shaft of the reaction force device.

\* \* \* \* \*